United States Patent [19]
Polach

[11] Patent Number: 6,105,553
[45] Date of Patent: Aug. 22, 2000

[54] METHOD AND FUEL INJECTION SYSTEM FOR OPERATING IN INTERNAL COMBUSTION ENGINE

[75] Inventor: Wilhelm Polach, Moeglingen, Germany

[73] Assignee: Robert Bosch GmbH, Stuttgart, Germany

[21] Appl. No.: 09/163,544

[22] Filed: Sep. 30, 1998

[30] Foreign Application Priority Data

Sep. 30, 1997 [DE] Germany .......................... 197 43 060

[51] Int. Cl.[7] .................................................. F02M 7/00
[52] U.S. Cl. .................................. 123/435; 123/198 DB; 123/305
[58] Field of Search .................................. 123/435, 305, 123/198 DB

[56] References Cited

U.S. PATENT DOCUMENTS

| | | | |
|---|---|---|---|
| 4,487,177 | 12/1984 | Ishikawa | 123/620 |
| 5,136,994 | 8/1992 | Gale . | |
| 5,247,910 | 9/1993 | Abe | 123/435 |
| 5,743,243 | 4/1998 | Yanagihara | 123/305 |
| 5,893,710 | 4/1999 | Brenner | 123/435 |

FOREIGN PATENT DOCUMENTS

| | | |
|---|---|---|
| 485 610 | 5/1992 | European Pat. Off. . |
| 2 065 764 | 7/1981 | United Kingdom . |
| 2 164 701 | 3/1986 | United Kingdom . |
| WO87/07678 | 12/1987 | WIPO . |

*Primary Examiner*—John Kwon
*Attorney, Agent, or Firm*—Ronald E. Greigg; Edwin E. Greigg

[57] ABSTRACT

A method and apparatus for operating an internal combustion engine in which in the event of erroneous fuel injection, combustion is maintained following the expansion stroke via a constantly hot spot in the combustion chamber, in such a way that erroneously introduced fuel is combusted, by reducing the oxygen content in the combustion chamber, such that no later than by the end of the compression stroke of the engine, a possible conversion of existing fuel and existing oxygen can no longer occur to any substantial extent, because of the heating of the contents of the combustion chamber toward the end of the compression stroke, thus preventing this malfunction from destroying the engine.

20 Claims, 1 Drawing Sheet

METHOD AND FUEL INJECTION SYSTEM FOR OPERATING IN INTERNAL COMBUSTION ENGINE

BACKGROUND OF THE INVENTION

The invention is based on a method and fuel injection system for operating an internal combustion engine. Such a method is realized in known fuel injection systems in which the fuel to be injected is available in a high-pressure fuel reservoir. Then however the danger is that because the fuel is constantly available at high pressure, if the fuel injection valve or its electrical triggering fails, then the fuel injection valve following fuel injection will remain in the open position, so that fuel will continue to be introduced constantly at high pressure into the applicable combustion chamber of the engine. In the ensuing compression stroke, this quantity of fuel may ignite abruptly together with the reintroduced fresh air. This leads to considerable heat production, associated with an extreme increase in pressure, one that is not contemplated for normal engine operation and thus can lead to the destruction of the engine.

OBJECT AND SUMMARY OF THE INVENTION

With the method of the invention as defined hereinafter and the fuel injection system for performing this method as set forth, it is attained that in the event of defective performance of a fuel injection valve, the fuel injection quantity introduced immediately subsequent to the intended fuel injection phase continues to burn, and this combustion of fuel is maintained with the existing oxygen, particularly the fresh air introduced during the intake phase into the combustion chamber of the engine, so that the oxygen present in the aspirated air is largely consumed by this precombustion, and at the end of the ensuing compression stroke only little heat from combustion can be delivered. Thus, no destructive pressure rise occurs at the instant of any suddenly commencing combustion. With the method and the fuel injection system of the invention, a conversion of the introduced fuel already occurs during the intake stroke, at least to such an extent that the introduced oxygen is consumed in this period of time, and further heat development toward the end of the compression stroke no longer occurs or at least can no longer have a destructive effect on the engine. Advantageously, any erroneous combustion proceeding in this way is detected from the drive work developed by the engine, and the engine is then stopped. To that end, it is possible to interrupt the fuel delivery to all the fuel injection valves, or in conjunction with exhaust gas recirculation and an air choke device that are provided in the engine, to stop the engine by excess exhaust gas recirculation. To perform the method, a constantly hot spot is provided, especially within range of the injection streams of the fuel injection valve. Advantageously, the electric control unit is connected to a monitoring arrangement, which trips a device for stopping the engine if combustion is erroneous. In accordance with the invention, a device for interrupting fuel delivery to all of the fuel injection points is advantageously activated. The engine can also advantageously be stopped in accordance with an existing exhaust gas recirculation device and an air choke device, by closure of the latter end opening of an exhaust gas recirculation valve in an exhaust gas recirculation line. The engine then rapidly comes to a stop for lack of oxygen. Advantageously, to achieve a flame that continues to burn, the exhaust gas recirculation line is also designed in such a way, that very hot exhaust gases are still delivered to the combustion chamber, and flame developments in the recirculated exhaust gas continue to keep the combustion process going as a consequence of the excessive fuel quantity being combusted. Moreover, a constantly hot spot may be embodied by a structural part, insulated from the cooled walls of the engine, which is located within range of the fuel injection streams of the fuel injection valve. Because of the high heat production during normal operation, such a structural part is given a very high surface temperature, because heat dissipation is prevented, cooling of this structural part is not possible, or at least is considerably restricted, because of its insulated arrangement. If fuel injection continues to occur, the ignition of the introduced fuel can be kept going at this structural part as well. Such a structural part may be provided in the form of a single glow body or as an insulated piston bottom part, which is reached directly by the fuel injection streams at least toward top dead center. As the constantly hot spot, a constantly heated glow plug can be used, which similarly to an ideally mounted glow body or insulated structural part keeps the combustion of introduced fuel going. Finally, such a hot spot can also be embodied by a spark plug, which particularly in the region of bottom dead center of the engine piston initiates ignition of the erroneously introduced fuel.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
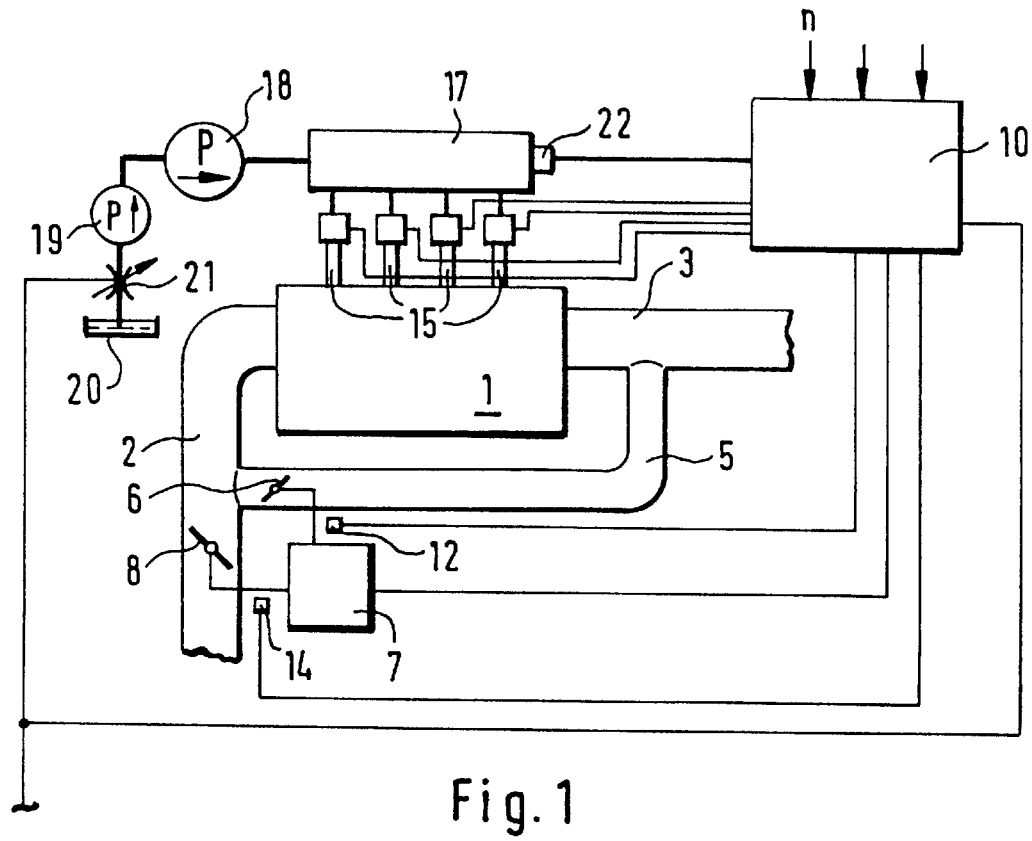
FIG. 1 shows a fuel injection system in which the method according to the invention is realized.

FIG. 1 shows a fuel injection system with an internal combustion engine 1, to which combustion air is delivered via an intake system 2 and whose exhaust gases are carried away via an exhaust gas collection system 3. In this engine, exhaust gas recirculation is also realized in the form of an exhaust gas recirculation line 5, which as close as possible to the outlet of the exhaust gases from the engine combustion chamber leads from the exhaust gas collection system to the intake system 2, and in which an exhaust gas recirculation valve 6 is disposed. The exhaust gas recirculation line discharges downstream of an air choke device 8 into the intake system. The air choke device and the exhaust gas recirculation valve are both shown in the form of throttle valves in the drawing but may also be realized in other ways. The actuation of the exhaust gas recirculation valve and the air choke device is done under electromechanical control by an adjusting device 7, in a manner known per se. This control device is itself controlled in turn by an electric control unit 10, which detects engine operating parameters and which receives the position of the exhaust gas recirculation valve from a first sensor 12 and the position of the air choke device from a second sensor 14, as control signals. The supply of fuel to the engine is effected via fuel injection valves 15, which are likewise electrically controlled and whose opening and closing is likewise tripped by the electric control unit 10. The fuel injection valves are associated here with engine combustion chambers, not shown in further detail, and are supplied with fuel at injection pressure from a high-pressure fuel reservoir 17. Upon opening of the fuel injection valves, tripped by the control unit 10, an injection is thus effected at the fixed time, via a contemplated time period in accordance with an intended fuel injection quantity.

The high-pressure fuel reservoir 17 is supplied with fuel by a high-pressure pump 18, to which a prefeed pump 19 supplies fuel in a metered fashion from a fuel supply tank 20, so that precisely the required quantity of high-pressure fuel that is also required for injection is delivered to the high-pressure fuel reservoir. Likewise, once again by the electric control unit 10, a quantity control device 21 is controlled at the inlet to the prefeed pump or to the high-pressure pump. As feedback, the electric control unit 10 receives information from a pressure sensor 22 on the magnitude of the fuel pressure prevailing in the high-pressure fuel reservoir. In accordance with the deviation from a set-point value, the high-pressure fuel quantity of the high-pressure pump 18 is then varied.

This control of the fuel quantity pumped into the high-pressure fuel reservoir is unable to prevent an excess of fuel injected through a fuel injection valve in the event of damage, since only the reservoir pressure but not the quantity withdrawn from the reservoir is regulated.

Figure 2:
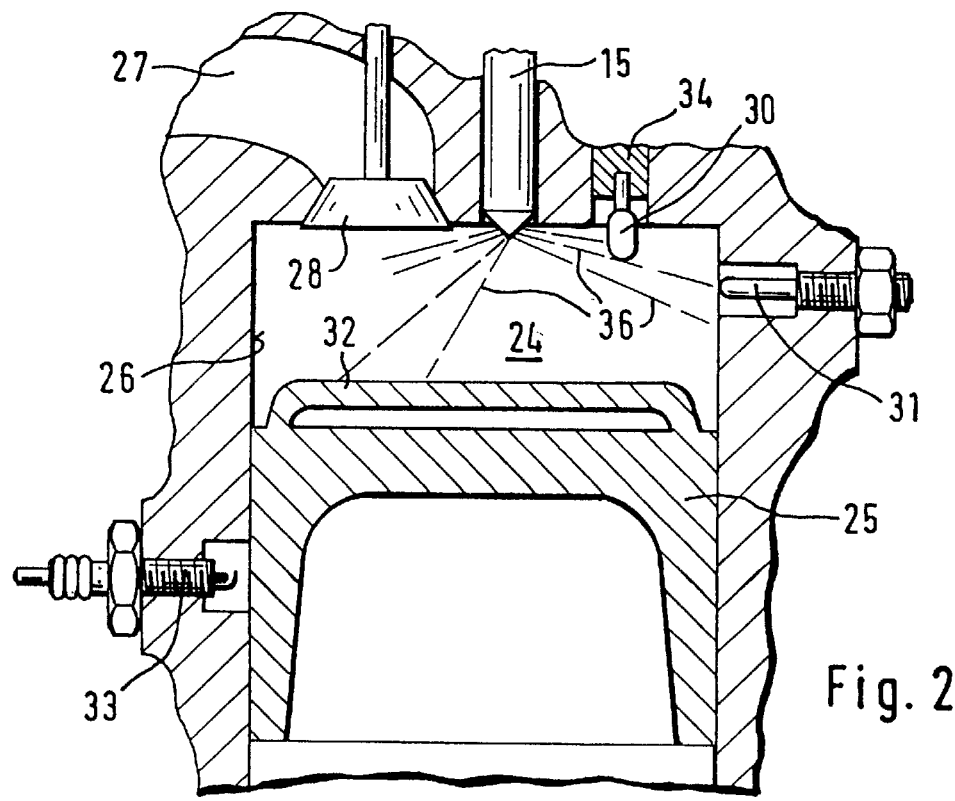
FIG. 2 shows various versions of a constantly hot spot, in terms of a section through the combustion chamber of an internal combustion engine, shown in symbolic form.

In FIG. 2, an individual combustion chamber 24 of the engine is schematically shown. This combustion chamber is enclosed by a piston 25 of the engine in a cylinder 26, into which air is aspirated via an intake conduit 27, controlled by a gas exchange valve 28 in the intake stroke of the engine, in accordance with the piston 25 moved downward, in terms of the drawing, toward bottom dead center. In the known four-stroke process, following this intake stroke a compression stroke is performed, with a piston moving upward to top dead center, and the combustion air now trapped in the combustion chamber 24 is highly compressed in this stroke, so that fuel then subsequently injected, directly for example, into the combustion chamber through the fuel injection valve 15 is immediately ignited there in the heated air. This ignition of the fuel increases the volume, equivalent to a pressure rise, as a consequence of which the piston 25 is moved downward in the ensuing expansion stroke and executes a work stroke. In the ensuing upward-returning stroke, or expulsion stroke, the combusted ingredients are fed into the exhaust gas collection system, via a gas exchange valve not shown here.

In addition to the known embodiment, alternatively a glow body 30, a glow plug 31, an insulated bottom 32 of the piston 25, or an additional spark plug 33 are now provided.

In these three embodiments, each of which can be realized on its own or in combination with one or the other of them, a common feature is that they all create a hot spot in the combustion chamber. For instance, the glow body 30 is fixed in the combustion chamber 24 or on the combustion chamber wall by means of a suitable insulation 34. This prevents the heat absorbed by the glow body from being capable of dissipated immediately to the cooled walls of the engine. Instead, the glow body is heated very severely and brought to a temperature at which arriving fuel can ignite. To that end, the glow body is introduced into the range of the fuel injection streams 36. If injection should continue even after the intended end of injection, because of some defect of the fuel injection valve, and of course in that case there is enough fuel available at high pressure from the high-pressure fuel reservoir, then this fuel meets the glow body 30 and is consequently ignited. In this way, a burnoff of introduced fuel can be maintained into the expansion stroke and on into the intake stroke, as long as enough oxygen is available in the combustion chamber 24. Thus the introduced fuel continuously burns off and in this way reduces the oxygen content in the combustion chamber, in such a way that toward the end of the compression stroke no sudden ignition with an attendant high pressure rise can occur. Instead, given a suitable design of the structural parts, the oxygen content in the combustion chamber has by now dropped enough that following the compression stroke, no expansion stroke with significant work produced is attainable. Because the oxygen has been reduced, the combustion in the combustion chamber is throttled or prevented. The constantly hot glow body moreover does not hinder the mode of operation during normal engine operation. Since the onset of ignition depends in principle on the instant of injection of the fuel into the combustion chamber 24, it does not matter at that time whether the ignition of the fuel is effected at the heated air or at the glow body. In the event of failure, however, the glow body performs a very essential function as described above.

Instead of the glow body, a glow plug 31 may also be provided, which however can then be heated in addition, if necessary. This heating can also be controlled by a thermostat. The pin of the glow plug 31 is then likewise located within the range of the fuel injection streams of the fuel injection valve 15, and the mode of operation in this connection is the same as with the glow body 30. The electrically heatable glow plug, however, has the advantage here that at a low temperature level in the combustion chamber, especially in the starting phase, the necessary temperature of ignition can in principle be furnished.

As an alternative to the glow body 30 or the glow plug 31 or in addition to them, a thermally insulated bottom part 32 of the piston 25 of the engine may be provided as the constantly hot spot. By spacing the bottom part 32 away from the rest of the piston, the outflow of heat to the cooled side of the piston is also reduced here, leading to a large piston service area at which arriving fuel particles can ignite.

Finally, it is also possible to mount a spark plug 33, which at bottom dead center, as soon as it has communication with the combustion chamber, once the spark plug has been uncovered by the piston 25, is subjected to voltage and furnishes an igniting spark as the constantly hot spot.

By means of the electric control unit, the rpm and/or rpm fluctuations of the engine are detected and/or a detection signal is derived from other parameters and provides information on proper operation of the engine. If the evaluation device in the electric control unit 10 ascertains that normal combustion is impeded, then the electric control unit outputs a signal to stop the engine. To that end, on the one hand an interruption in fuel delivery to all the fuel injection valves can be tripped in such a way that these electrically controlled valves are stopped in a position that keeps the fuel injection valve in a closed state. In addition, the high-pressure pumping of the high-pressure fuel pump 18 can be correspondingly reduced or turned off. Another option for stopping the engine, if as shown here it is operated with exhaust gas recirculation, is for the electric control unit to close the air choke device 8 via the adjusting device 7 and to open the exhaust gas recirculation valve 6 all the way. This stops the engine for lack of oxygen. If the exhaust gas recirculation line branches off from the exhaust gas collection system very near the outlet of exhaust gases from the engine combustion chambers, and if it leads over a very short distance back to the intake system 2, then delayed combustion, in particular as a consequence of the above-described operation of recombustion of erroneously injected fuel, are extended even into the intake stroke of the engine, so that because of the delivered flame fronts or the remaining, severely heated oxygen, the continuous combustion of the incorrectly introduced fuel is provided.

With the method described and the fuel injection system for performing the method, a very reliable provision is gained for avoiding overheating and engine damage in the event that the injection quantity control fails, and for creating criteria on the basis of which an overall safe and reliable shutoff of the engine takes place.

The foregoing relates to preferred exemplary embodiments of the invention, it being understood that other variants and embodiments thereof are possible within the spirit and scope of the invention, the latter being defined by the appended claims.

I claim:

1. A method for operating an internal combustion engine comprising introduction of air via an intake system of the invention into combustion chambers of the engine in an intake stroke, compression of the introduced air including oxygen in the combustion chamber in a compression stroke, with injection of fuel at high pressure into the combustion chamber and self-ignition of the introduced fuel with the oxygen from the air by self-ignition in an expansion stroke, and expulsion of the combustion products in an expulsion stroke of the engine, controlling the fuel injection by an electric control unit that controls fuel injection valves which are each assigned to one combustion chamber of the engine and are supplied with fuel from a high-pressure fuel reservoir, brought to a high pressure, providing a constantly operated hot spot in the combustion chamber thereby providing a burning flame which is kept going beyond the expansion stroke and until the end of the intake stroke with excessively introduced fuel in the event of failure of the control of the fuel injection quantities, as long as oxygen from the air along with fuel is still available for combustion.

2. The method according to claim 1, which comprises connecting the electric control unit to a monitoring device, with which erroneous combustion is detected from the drive work, and stopping the engine in the event of erroneous combustion of the engine.

3. The method according to claim 2, in which the delivery of fuel is interrupted to all the fuel injection valves in order to stop the engine.

4. The method according to claim 2, which comprises providing the engine with an exhaust gas recirculation device, which has an air choke device and downstream thereof an exhaust gas recirculation line into the intake system having the exhaust gas recirculation valve, both of which are monitored in their function by the electric control unit, and for stopping the engine, adjusting the exhaust gas recirculation device to maximum exhaust gas recirculation and minimum air delivery by the control device in the event of erroneous combustion.

5. The method according to claim 4, in which the exhaust gases to be recirculated are drawn from the combustion chamber as slow as possible to their outlet therefrom.

6. A fuel injection system for internal combustion engines that operate with self-ignition and having cooled walls, comprising an intake system (2) which is made to communicate with combustion chambers of the engine, having gas exchange valves (28), by way of which an intake stroke, a compression stroke, an expansion stroke, and an expulsion stroke are controlled in succession, fuel injection valves (15), for fuel injection at high pressure into the combustion chambers of the engine, an exhaust gas collection system (3) into which the products of combustion, controlled by the gas exchange valves, are expelled, an electric control unit (10), by which the fuel injection valves (15) are controlled, one each of said fuel injection valves being assigned to one combustion chamber of the engine and supplied with fuel, brought to a high pressure, from a high-pressure fuel reservoir (17), a constantly operated hot spot (30, 31, 32, 33) is provided in the combustion chamber, within range of an injection stream of the fuel injection valve, in the event of failure of a control of the fuel injection quantities, a burning flame is kept going because of said hot spot beyond the expansion stroke until an end of the intake stroke, as long as oxygen from the air along with fuel is still available for combustion.

7. The fuel injection system according to claim 6, in which the electric control unit is connected to a monitoring device which detects erroneous combustion from the drive work, and if erroneous combustion is present trips a device for stopping the engine.

8. The fuel injection system according to claim 7, in which the device for stopping the engine is a device for interrupting the delivery of fuel to all the fuel injection valves (15).

9. The fuel injection system according to claim 7, in which the engine is provided with an exhaust gas recirculation device, which has an air choke device (8) inserted into the intake system and an exhaust gas recirculation line (5) that discharges downstream thereof into the intake system, an exhaust gas recirculation valve (6), having a device, associated with the electric control unit (10), for monitoring a function of the exhaust gas recirculation device, and an adjusting device (7), controlled by the control device, for opening the exhaust gas recirculation valve (6) and closing the air choke device (8) in the event of erroneous combustion.

10. The fuel injection system according to claim 8, in which the engine is provided with an exhaust gas recirculation device, which has an air choke device (8) inserted into the intake system and an exhaust gas recirculation line (5) that discharges downstream thereof into the intake system, an exhaust gas recirculation valve (6), having a device, associated with the electric control unit (10), for monitoring a function of the exhaust gas recirculation device, and an adjusting device (7), controlled by the control device, for opening the exhaust gas recirculation valve (6) and closing the air choke device (8) in the event of erroneous combustion.

11. The fuel injection system according to claim 9, in which the exhaust gas recirculation line (5) leads from the exhaust gas collection system (3) directly out of the combustion chambers, at the outlet of the exhaust gases, to the intake system (2).

12. The fuel injection system according to claim 10, in which the exhaust gas recirculation line (5) leads from the exhaust gas collection system (3) directly out of the combustion chambers, at the outlet of the exhaust gases, to the intake system (2).

13. The fuel injection system according to claim 6, in which the constantly hot spot is a structural part (30) which is isolated from the cooled walls of the engine and is disposed in a range of at least one fuel injection stream (36) of the fuel injection valve (15).

14. The fuel injection system according to claim 7, in which the constantly hot spot is a structural part (30) which is isolated from the cooled walls of the engine and is disposed in a range of at least one fuel injection stream (36) of the fuel injection valve (15).

15. The fuel injection system according to claim 8, in which the constantly hot spot is a structural part (30) which is isolated from the cooled walls of the engine and is disposed in a range of at least one fuel injection stream (36) of the fuel injection valve (15).

16. The fuel injection system according to claim 9, in which the constantly hot spot is a structural part (30) which is isolated from the cooled walls of the engine and is disposed in a range of at least one fuel injection stream (36) of the fuel injection valve (15).

17. The fuel injection system according to claim 13, in which an insulated piston bottom part (32) of the engine piston acts as the constantly hot spot.

18. The fuel injection system according to claim 13, in which a glow body (30) adjacent to the fuel injection valve is provided as the constantly hot spot.

19. The fuel injection system according to claim 13, in which a constantly heated glow plug (32) serves as the constantly hot spot and is disposed in range of the fuel injection stream (36) of the fuel injection valve (15).

20. The fuel injection system according to claim 13, in which a spark plug (33) uncovered by the piston (25) of the engine near bottom dead center is provided as the constantly hot spot.

* * * * *